(12) United States Patent
Mollhagen

(10) Patent No.: US 7,544,033 B1
(45) Date of Patent: Jun. 9, 2009

(54) TRAILER

(76) Inventor: Jon Davis Mollhagen, P.O. Box 80, Lorraine, KS (US) 67459

( * ) Notice: Subject to any disclaimer, the term of this patent is extended or adjusted under 35 U.S.C. 154(b) by 0 days.

(21) Appl. No.: 12/006,878

(22) Filed: Jan. 7, 2008

Related U.S. Application Data

(62) Division of application No. 10/892,699, filed on Jul. 16, 2004, now abandoned.

(60) Provisional application No. 60/488,637, filed on Jul. 18, 2003.

(51) Int. Cl.
*B60P 1/00* (2006.01)

(52) U.S. Cl. ..................... 414/539; 280/43; 280/441.2

(58) Field of Classification Search ............ 280/441.2, 280/425.2, 420, 421, 43, 43.11, 43.17; 180/41; 414/25, 111, 132, 495, 539
See application file for complete search history.

(56) References Cited

U.S. PATENT DOCUMENTS 3,894,645 A * 7/1975 Verschage ................. 414/481

| | | |
|---|---|---|
| 6,595,540 B1 | 7/2003 | MacKarvich |
| 6,622,646 B1 * | 9/2003 | Bennett et al. ............... 111/52 |

* cited by examiner

*Primary Examiner*—Michael S Lowe
(74) *Attorney, Agent, or Firm*—Robert O. Blinn

(57) ABSTRACT

The present invention is an improved trailer for processing items. The trailer includes a frame, translating wheel assemblies and a pivoting hitch assembly. Each translating wheel assembly includes a stationary portion fixed to the frame and a translating portion for carrying at least one wheel. The translating portions of the wheel assemblies move up and down between a first extended position in which the wheels support the frame of the trailer and a second retracted position in which the frame sits on the ground. The hitch assembly includes an arm for coupling the trailer to a tractor vehicle. The arm moves between a first trailering position and a second stowed position. The arm is pivoted into the stowed position so that it does not interfere with process items entering or leaving the trailer.

2 Claims, 13 Drawing Sheets

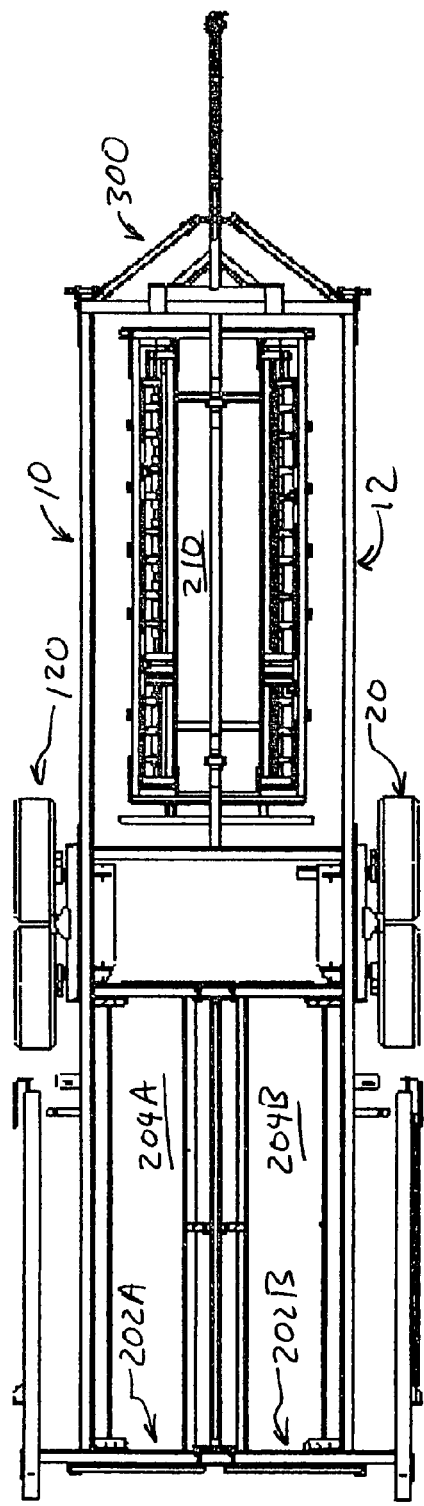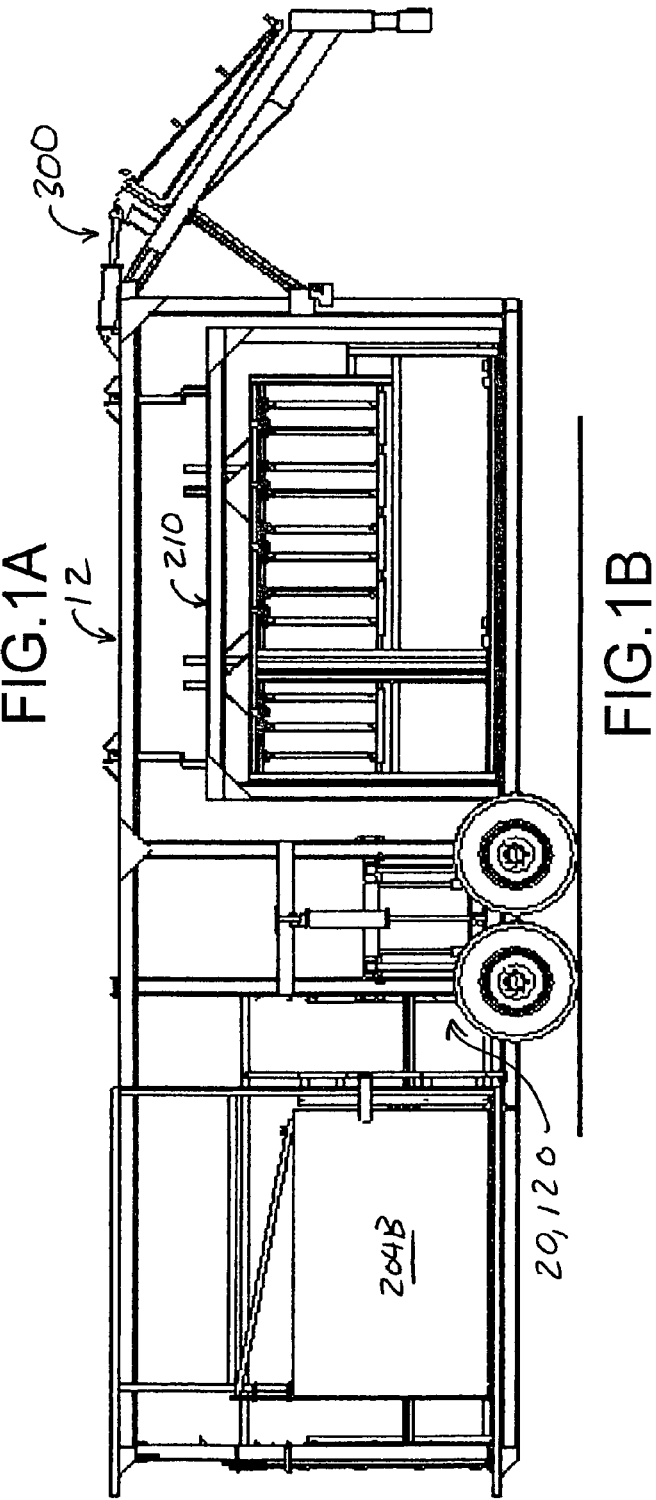

TRAILER

This application is a divisional of application Ser. No. 10/892,699 filed on Jul. 16, 2004 now abandoned.

application Ser. No. 10/892,699 claimed the benefit of U.S. Provisional Patent Application No. 60/488,637 filed Jul. 18, 2003.

FIELD OF THE INVENTION

The present invention relates to a trailer for processing items.

BACKGROUND OF THE INVENTION

Specialized trailers or transportable units have long been used to process items. Such trailers or transportable units may be used to conduct livestock through a veterinary procedure or to process or sort materials. Such processes might also include the sorting or packaging of produce, the sorting of recyclable materials or even the processing of people for vaccinations. In each of these cases, the goal is to receive process items at a first end of a unit, rapidly move process items through the unit between the first end and an opposite second end and rapidly move the processed items out of the unit through an exit at the second opposite end of the unit. Such a trailer or unit must meet two basic design requirements. First, such a trailer or unit must be supported by wheels at a height sufficient to provide ground clearance for transport. Secondly, a trailer or unit must have a hitch structure for engaging a tractor vehicle. However, the rapid movement of process items into and out of a trailer is hindered when the trailer is elevated above ground level. Moreover, the forward hitch structure interferes with the placement and use of an entrance or an exit at the forward end of the trailer. This presents yet another obstacle to the rapid movement of process items through a trailer. Accordingly, design features that enhance a trailer for transportation purposes conflict with the design features that would enhance a unit intended for rapidly receiving and processing items.

SUMMARY OF THE INVENTION

The purpose of the present invention is to provide a transportable unit which satisfies the need for mobility while providing a ground level structure through which process items may rapidly enter at a first end, move through the trailer and exit at its second opposite end while remaining substantially near ground level. An example of such process items might include livestock receiving veterinary treatments. Accordingly, the present invention is an improved transportable unit which provides a flow through structure having an entrance at one end for receiving process items and an exit at the opposite end for discharging process items. The trailer includes a frame, opposing, side mounted translating wheel assemblies and a front mounted pivoting hitch assembly. Each translating wheel assembly includes a stationary portion fixed to the frame and a translating portion which carries at least one wheel. The translating portion of each wheel assembly is mechanically coupled to the corresponding stationary portion for movement along an upright path between a first extended position in which the at least one wheel supports the trailer for rolling movement of the trailer and a second retracted position in which the trailer rests on the ground. An actuator mechanically connecting between the stationary portion and the translating portion of each wheel assembly moves the translating portion relative to the stationary portion between the first extended position and the second retracted position. The hitch assembly includes an arm for coupling the trailer to a tractor vehicle. The arm is pivotably mounted to the frame at one end of the trailer for motion between a first trailering position wherein the arm connects the trailer to the tractor vehicle and a second stowed position wherein the arm is pivoted sufficiently away from the end of the trailer to provide clearance to process items entering or exiting the end of the trailer.

The trailer of the present invention is capable of operating in a transport mode and in a processing mode. When in the transport mode, the opposite side mounted wheel assemblies are lowered and locked in the first extended position such that the trailer is elevated from the ground surface and supported by the wheels. Also, when in the transport mode, the hitch assembly is locked in the first trailering position such that the arm of the hitch may be coupled to a tractor vehicle. When in the processing mode, the wheel assemblies are elevated into the second retracted position such that the trailer is resting on the ground so that the floor or lower frame structure of the trailer is near ground level. Also, when in the processing mode, the hitch assembly is swung away from the trailering position and locked in a second stowed position such that it does not obstruct the exit at the front end of the trailer. Accordingly, the trailer, when in the processing mode, may be opened at both ends for the unobstructed entrance and exit of process items and may also be positioned at ground level such that process items may easily enter, pass through the trailer and exit the trailer.

BRIEF DESCRIPTION OF THE DRAWINGS

FIG. 1A is a top view of the trailer of the present invention.

FIG. 1B is a side view of the trailer of the present invention.

DETAILED DESCRIPTION

Figure 2:
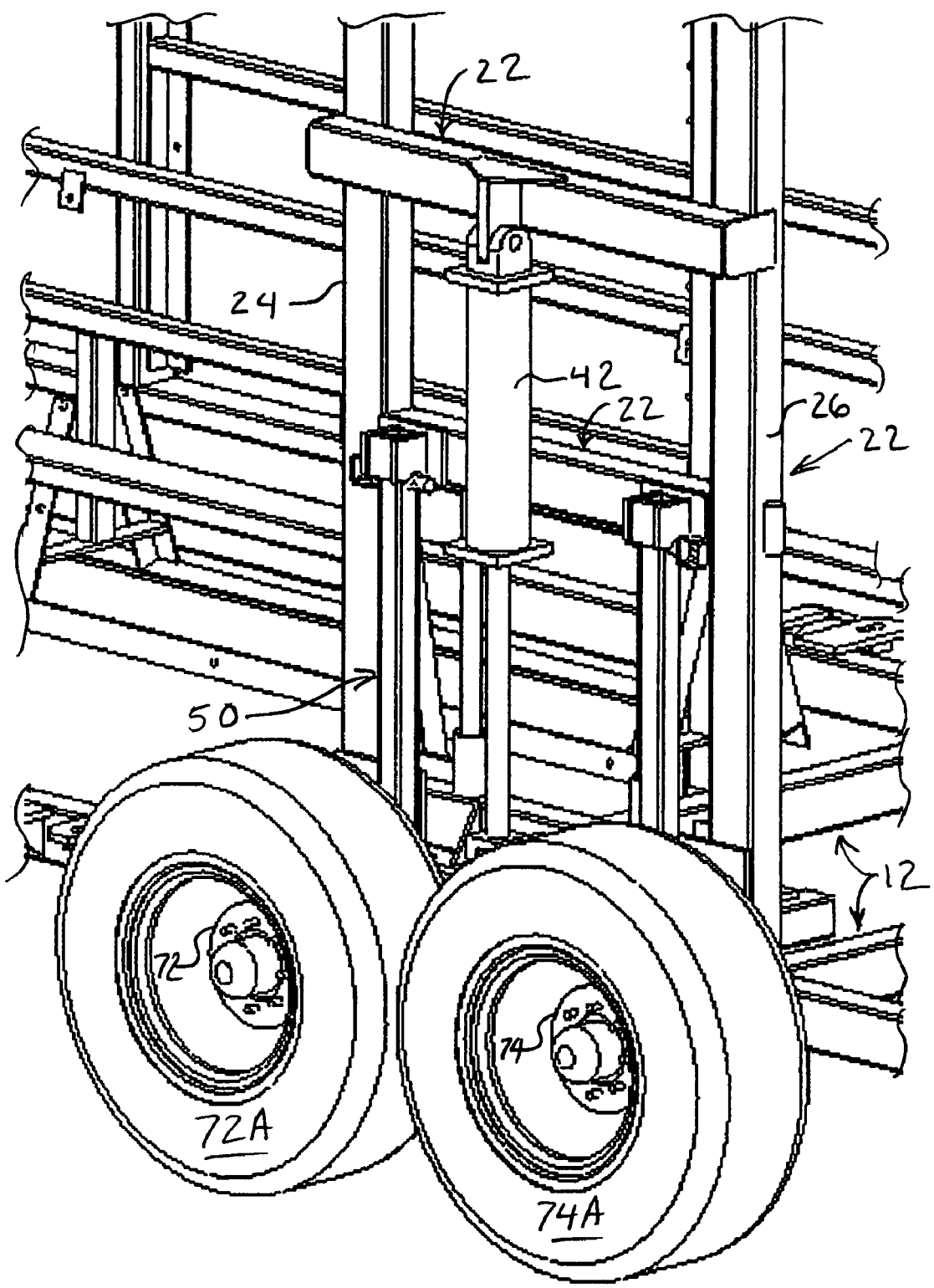
FIG. 2 is a perspective view of a translating wheel assembly.

Referring to the drawings, FIG. 1 shows a trailer 10 in accordance with an embodiment of the present invention. As can be seen in FIG. 1, trailer 10 includes a frame 12, right and left translating wheel assemblies 20 and 120 and a hitch assembly 300. It should be understood that the term "trailer" as used here is intended to mean a transportable unit that can be towed by a tractor vehicle. The word "trailer" is often used to indicate a towed vehicle for transporting cargo. However, in this description the applicant intends the word "trailer" to mean a wheeled transportable unit that is designed to be pulled by a tractor vehicle such as a flat bed truck. In this example, trailer 10 provides a transportable unit for receiving cattle, controlling their movement, restraining them for various procedures such as vaccinations and then discharging them after such procedures have been conducted. The elements of the present invention could also be adapted for another type of flow through unit or even a transport unit for transporting large animals or cargo. In the case of a large animal transport unit, the features of the invention would facilitate the loading of large animals at ground level through a rear entrance as well as the later discharge of those animals at ground level through a forward exit.

FIG. 1A provides a top view of trailer 10 while FIG. 1B provides a side view of trailer 10. Trailer 10, in this example, is a unit designed for receiving and moving cattle through a process such as vaccination. Trailer 10 includes entrances 202A and 202B, two tandem alleys 204A and 204B, a squeeze chute 210 and an exit 212. Animals enter through entrances 202A and 202B, are held briefly in tandem alleys 204A and 204B and are alternately directed through squeeze chute 210. Squeeze chute 210 is a hydraulically driven device which closes around and holds an animal stationary. Squeeze chute 210 is of the type described in U.S. Pat. No. 6,425,351 which was issued to the applicant and which is incorporated herein by reference. Squeeze chute 210A is suspended from load cell transducers which are used to measure the weight of the cattle as they are held in squeeze chute 210A. In this example entrances 202A and 202B and exit 212 are positioned at the opposite ends of the trailer. In the alternative, a trailer for processing animals could be designed with an entrance or entrances on both sides or one side of the trailer. A trailer for conducting other processes may be also be designed such that an entrance or an exit is located in the side of the trailer.

Trailer 10, as described above, contains equipment for handling large animals such as cattle. In this example, it is important to the function of trailer 10 that animals can enter quickly and proceed through squeeze chute 210A as rapidly as possible. Increased labor and stress to the animals would result if the movement of animals is delayed or hindered. Moreover, veterinarians are usually compensated in proportion to the number of animals they treat—not for the time spent treating them and therefore prefer to move animals through a procedure such as a vaccination as quickly as possible. Accordingly, trailer 10 is designed to minimize the obstacles encountered by cattle as they enter, move through and exit trailer 10. Any process benefits from rapid throughput. The same need for easy entry, movement and egress might be present if trailer 10 carried equipment or an apparatus intended for another type of processing task where rapid thru-put was advantageous.

Trailer 10 is most easy to enter and exit when it is resting at ground level and when hitch assembly 300 is rotated up into a stowed position. To accomplish this, translating wheel assemblies 20 and 120 include translating portions which can be moved between a first extended position and a second retracted position. Moreover, hitch assembly 300 is designed to rotate from a trailering position shown in FIG. 1A into a stowed position shown in FIG. 8A.

Translating wheel Assemblies

Translating wheel assemblies 20 and 120 are opposite, symmetrically identical assemblies. Only translating wheel assembly 20 will be shown and described in detail below. Every element described and designated as 20 through 74 in FIGS. 1-7 in translating wheel assembly 20 should be understood as having an opposite, corresponding element numbered between 120 and 174 in opposite translating wheel assembly 120. Accordingly, if 100 were added to all of the reference numerals between 20 and 74 in the detailed description below and FIGS. 2-7, the reader would have a detailed description of translating wheel assembly 120. Those skilled in the art will also appreciate that the translating portions of translating wheel assemblies 20 and 120 must be actuated substantially in unison so that trailer 10 may be raised in a level fashion.

Translating wheel assembly 20 is shown in greater detail in FIGS. 2-7. In FIGS. 3-7, translating wheel assembly 20 is shown with its wheels removed for clarity. In the example shown and described here, translating wheel assemblies 20 and 120 as well as frame 12 are fashioned from steel plate and standard steel cross sections well known to those skilled in the art. Steel is selected because it is strong, relatively easy to work and can be easily welded into strong rigid structures.

Figure 3:
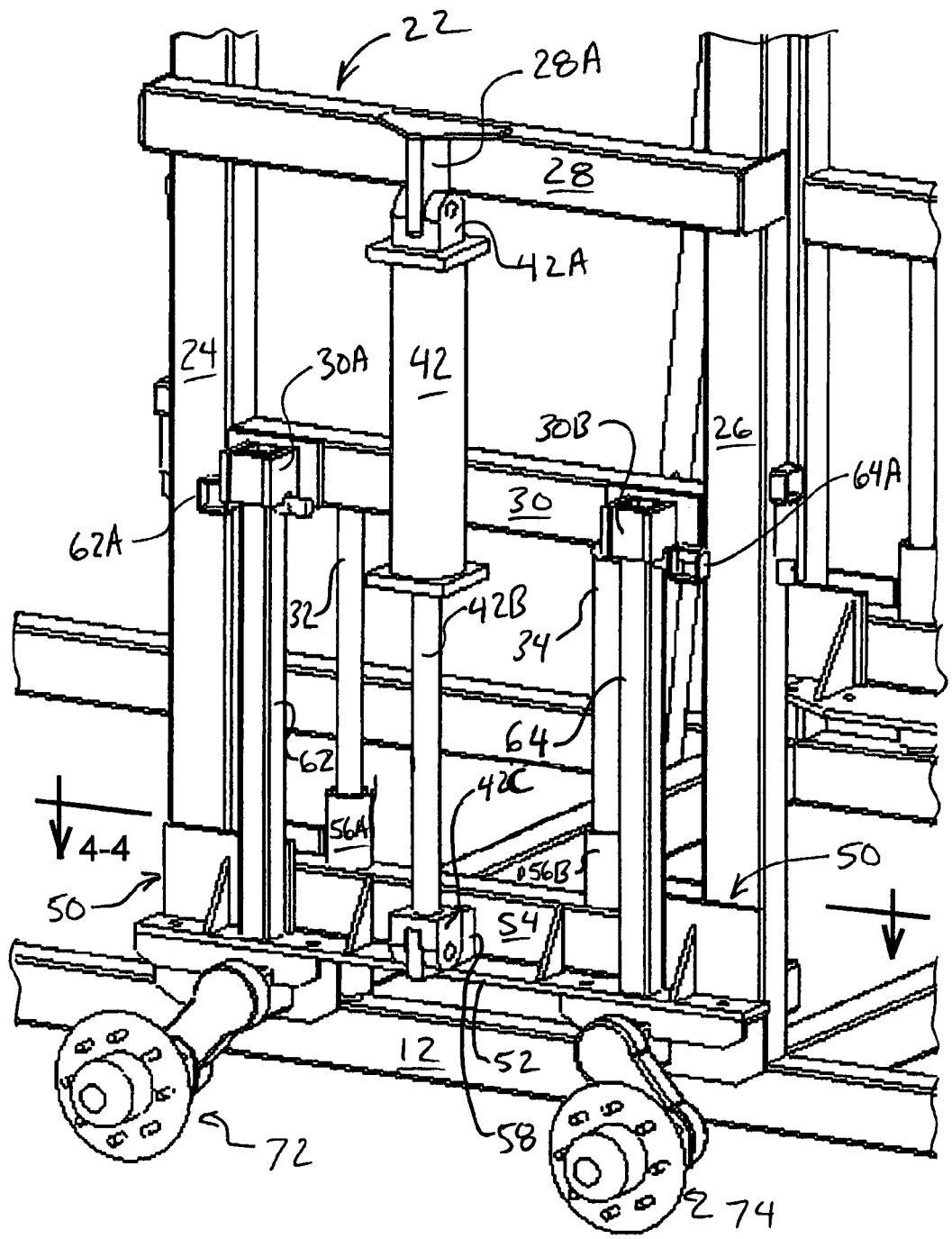
FIG. 3 is a perspective view of a translating wheel assembly with the wheels removed for clarity.
Figure 4:
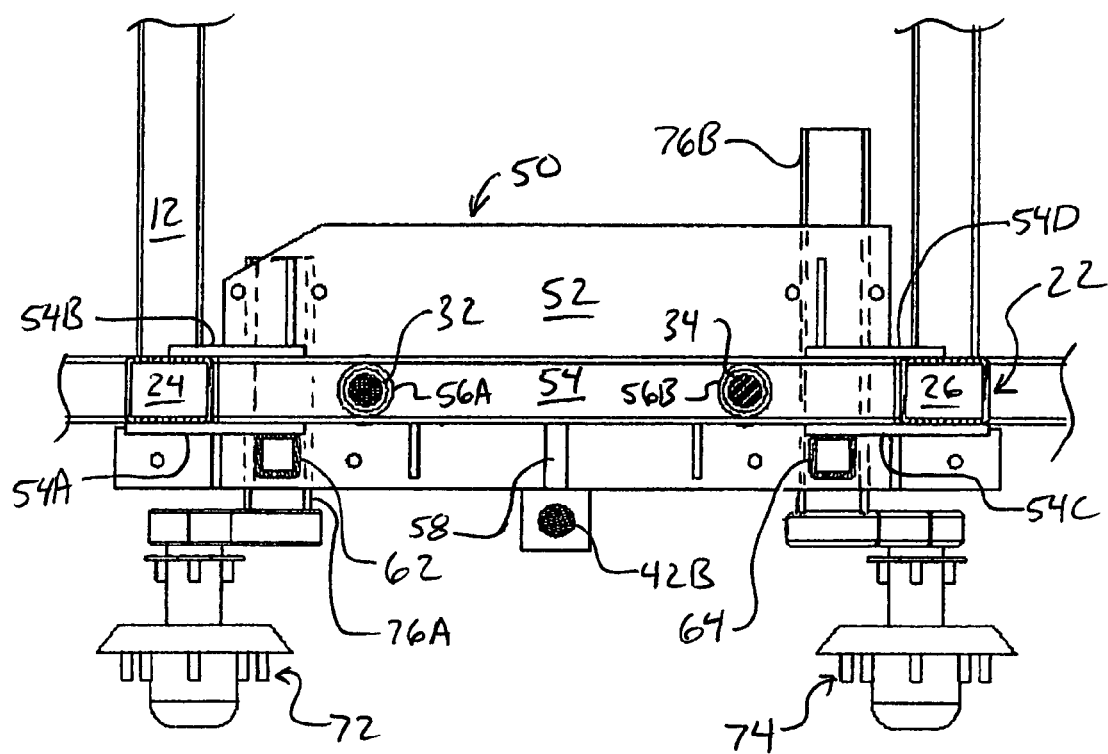
FIG. 4 is a sectional top view of the translating wheel assembly of FIG. 3 taken from plane 4-4.
Figure 7:
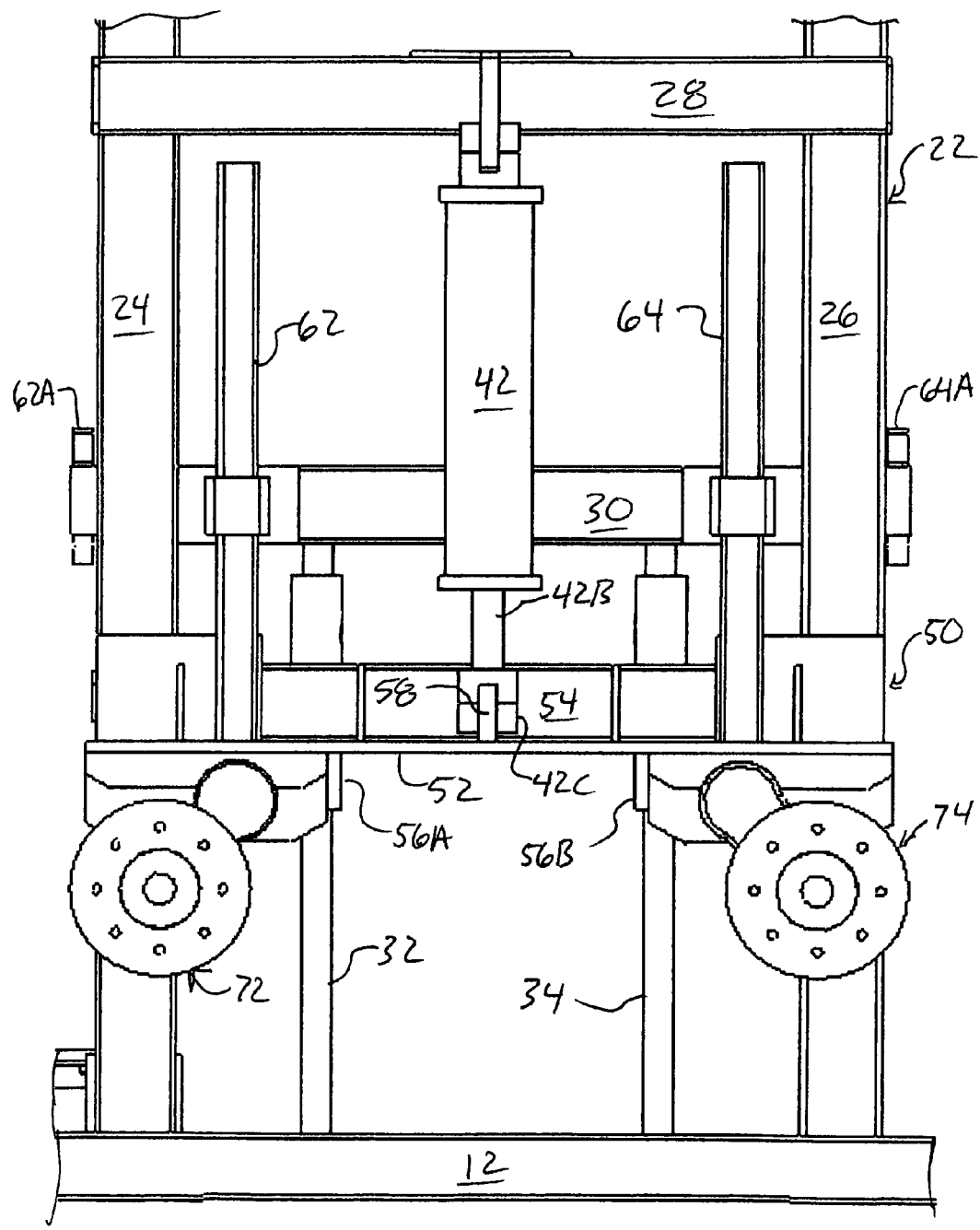
FIG. 7 is a side view of the translating wheel assembly with the translating portion in the second retracted position.

As can be seen in FIGS. 2 and 3, translating wheel assembly 20 includes a stationary portion 22 and a translating portion 50. Stationary portion 22 is fixed to frame 12 of trailer 10. Translating portion 50 is mounted to stationary portion 22 for sliding movement relative to stationary portion 22 along an upright path. Generally, both translation portion 50 and stationary portion 22 include corresponding members and fittings which are arranged for sliding movement relative to each other. Because of this, translating portion 50 is constrained to move along an upright path described by the upright members of translating portion 50 and stationary portion 22. An actuator, which in this example is a hydraulic cylinder 42, is connected between stationary portion 22 and translating portion 50. Hydraulic cylinder 42 extends and contracts to move translating portion 50 between a first extended position as shown in FIG. 2 and a second retracted position as shown in FIG. 7.

Stationary portion 22 is essentially a rigid rectangular frame. It is bounded on each side by a first upright support member 24 and a second upright support member 26. A first horizontal support member 28 connecting between upright support members 24 and 26 bounds stationary portion 22 at its upper end. First horizontal support member 28 includes a 1 µg 28A for receiving clevis 42A at the upper end of hydraulic cylinder 42. Positioned below first horizontal support member 28 and connecting between upright support members 24 and 26 is a second horizontal support member 30. Second horizontal support member 30 carries two stationary fittings 30A and 30B for receiving two upright members of translating portion 50 which will be described in greater detail below. One of the lower horizontal members of frame 12 bounds stationary portion 22 at its lower end. A pair of spaced upright shafts 32 and 34 are fixed to second horizontal member 30 and frame 12. As will be described in greater detail below, upright shafts 32 and 34 help guide the motion of translating portion 50.

Figure 5:
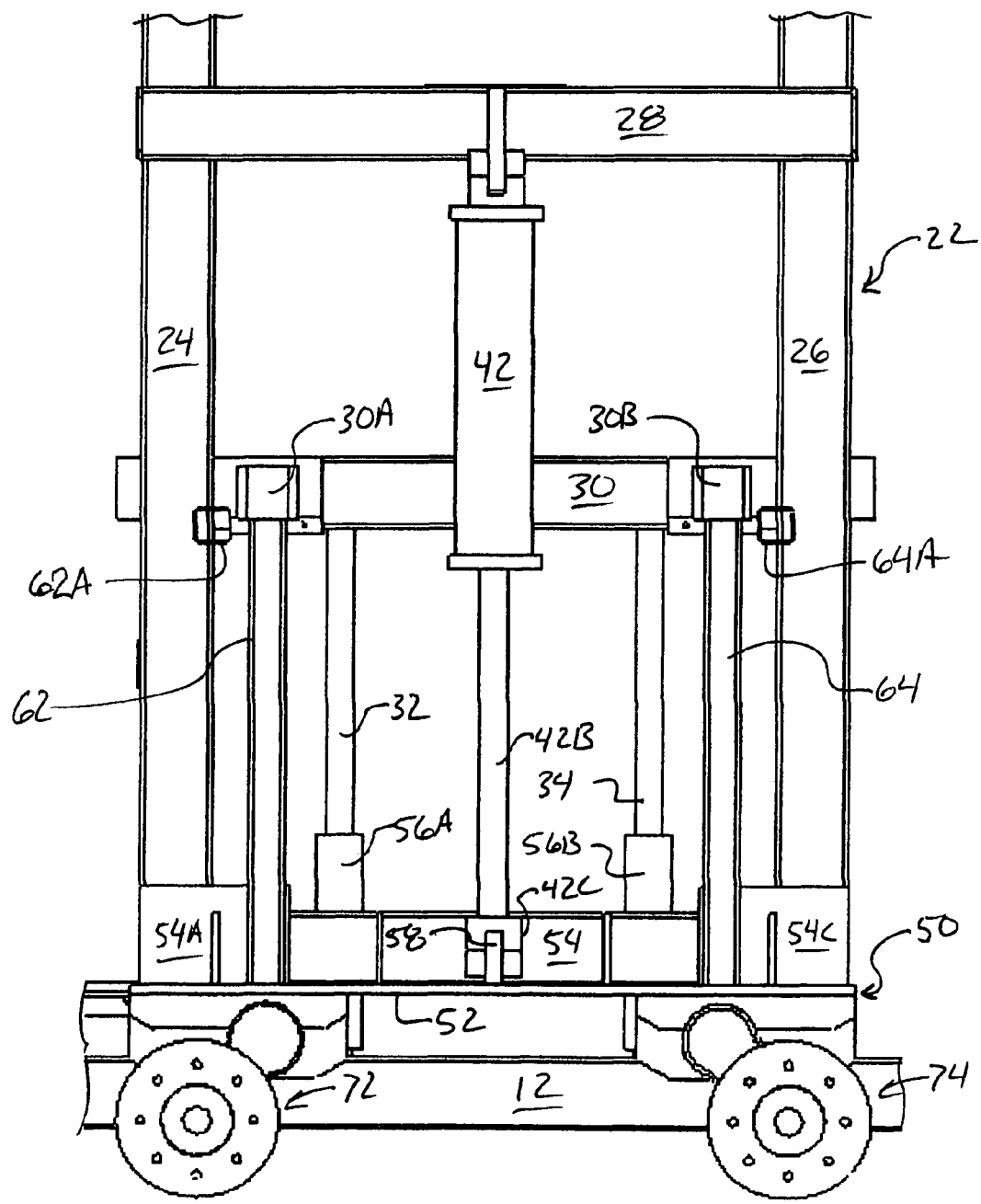
FIG. 5 is a side view of the translating wheel assembly with the translating portion in the first extended position.

Translating portion 50 is a rigid assembly designed for carrying a pair of wheel assemblies 72 and 74. Translating portion 50 includes a base plate 52, a transverse box beam 54, guide plates 54A, 54B, 54C and 54D, guide sleeves 56A and 56B, lug plate 58, reinforcing gussets 60A, 60B, 60C and 60D and first and second translating upright member 62 and 64. Box beam 54 is fixed to base plate 52 and carries guide plates 54A, 54B, 54C and 54D as well as guide sleeves 56A and 56B. Guide plates 54A and 54B are fixed to one end of box beam 54 while guide plates 54C and 54D and are fixed to the opposite end of box beam 54. The guide plates are positioned to bound first and second upright members 24 and 26 of stationary portion 22 on their inboard and outboard sides. Accordingly, guide plates 54A, 54B, 54C and 54D constrain translating portion 50 from inboard and outboard movement. Guide sleeves 56A and 56B are fixed to and pass through box beam 54. Guide sleeves 56A and 56B are sized and located to receive upright shafts 32 and 34 of stationary portion 22. Box beam 54 also has openings to accommodate upright shafts 32 and 34. Translating upright members 62 and 64 are sized and positioned such that they can be received by stationary fittings 30A and 30B of stationary portion 22. As noted above, stationary fittings 30A and 30B are mounted to second horizontal support member 30 of stationary portion 22. Translating upright members 62 and 64 include horizontally aligned openings for receiving lock pins 62A and 64A. As shown in FIGS. 2, 3 and 5, lock pins 62A and 64A are inserted through the aligned openings of upright members 62 and 64 to lock translating portion 50 in the first extended position. Lug plate 58 is welded to box beam 54 and base plate 52 and is designed to receive clevis 42C of hydraulic cylinder 42.

Independent torsional suspension units 76A and 76B mount wheel hubs 72 and 74 to translating portion 50. They prevent large impulses from being transferred into translating portion 50 and frame 12 when wheels 72A and 72B are rolling on an uneven surface. Torsional suspension units 76A and 76B are of a type well known in the art. They contain a pattern of rods which twist in response to torque. Torsional suspension units 76A and 76B are of different lengths in this example because wheel hubs 72 and 74 are unequally loaded.

The skilled reader should note that translating wheel assemblies 20 and 120 are independent assemblies. No axles connect between the opposite wheels of those assemblies. Axles would obstruct the interior of the trailer when the translating wheel assemblies are moved to the retracted position. The translating and stationary portions of the translating wheel assemblies with their upright members and corresponding fittings provide for retracting movement but are also strong enough to support the wheels such that no axles are needed.

As noted above, translating portion 50 moves between a first extended position and a second retracted position. When the translating portions of the two translating wheel assemblies are in the first extended position, wheels 72A and 74A shown in FIG. 2 and the corresponding wheels of opposite translating wheel assembly 120 support most of the weight of trailer 10. When the translating portions of the translating wheel assemblies are in the second retracted position, wheels 72A and 74A shown in FIG. 2 and the corresponding wheels of opposite translating wheel assembly 120 do not support any of the weight of trailer 10 but are raised at least slightly above ground level thus allowing trailer 10 to rest upon the surface of the ground. Hydraulic cylinder 42 moves translating portion 50 between the first and second position. Hydraulic cylinder 42 may be replaced by any suitable actuator.

Figure 6:
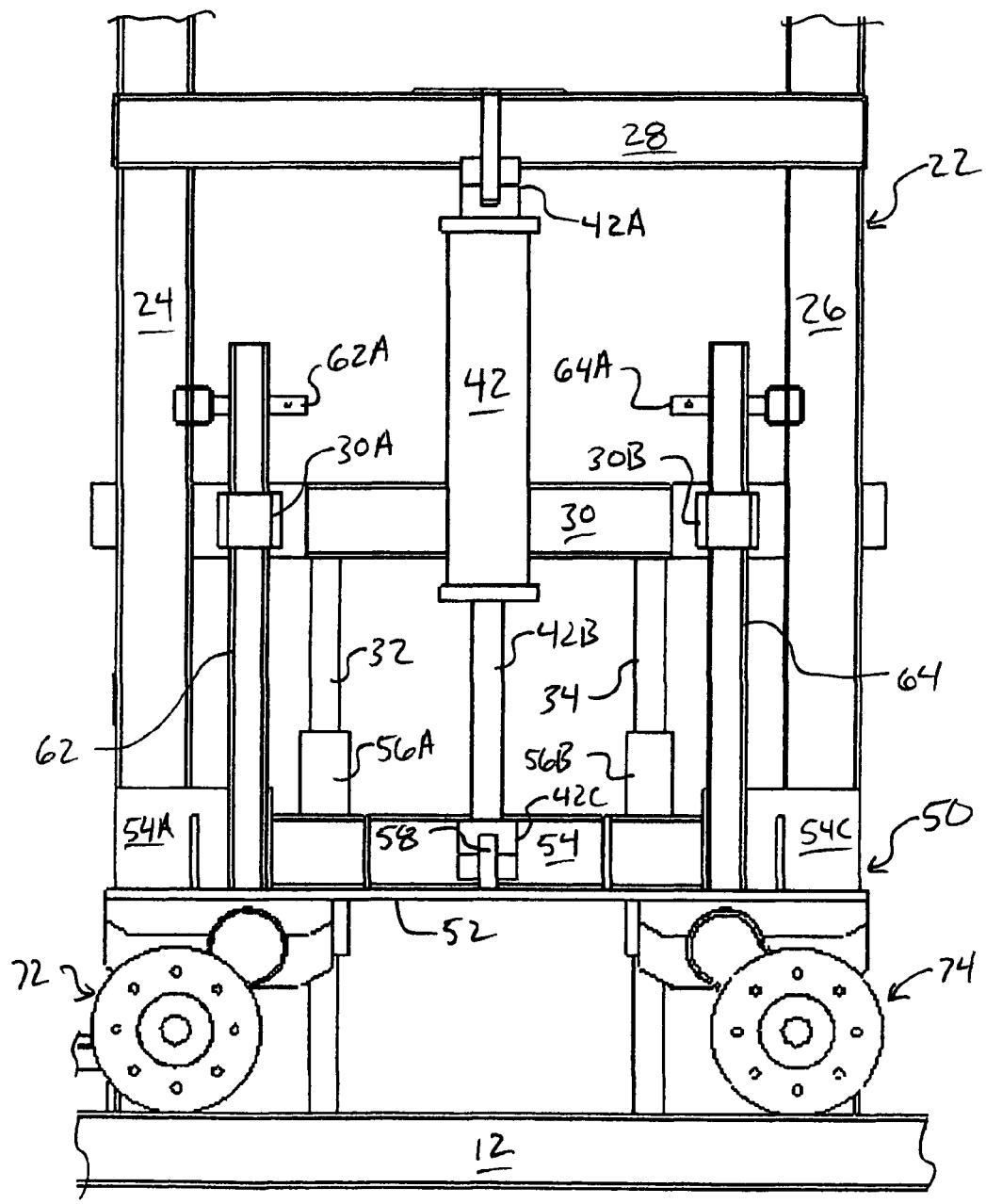
FIG. 6 is a side view of the translating wheel assembly with the translating portion positioned between the first extended position and the second retracted position.

FIGS. 2, 3 and 5 show translating portion 50 in the first extended position. When translating portion is in the first extended position, lock pins 62A and 64A are inserted through translating upright members 62 and 64 such that they engage stationary fittings 30A and 30B. When translating portion 50 is in the first extended position, vertical loads are transferred from base plate 52 and box beam 52 up through translating upright members 62 and 64 and eventually into upright members 24 and 26. In FIG. 6, translating portion 50 is shown between the first and second positions. FIG. 7 shows translating portion 50 in the second retracted position. When in the second retracted position, translating portion 50 does not carry any significant loads and can even be allowed to rest in a neutral fashion with wheels 72A and 74A resting upon the ground surface.

As can be seen from FIGS. 2-7 and the above description translating wheel assemblies 20 and 120 are designed to support trailer 10 with adequate ground clearance during transport and yet can be retracted so that trailer 10 may rest directly upon a ground surface. Because of the features described above, it is possible to construct a trailer which works well during a transport mode but that can also work well during a operational mode in which items are being moved into and through the trailer.

Pivoting Hitch Assembly

Figure 8:
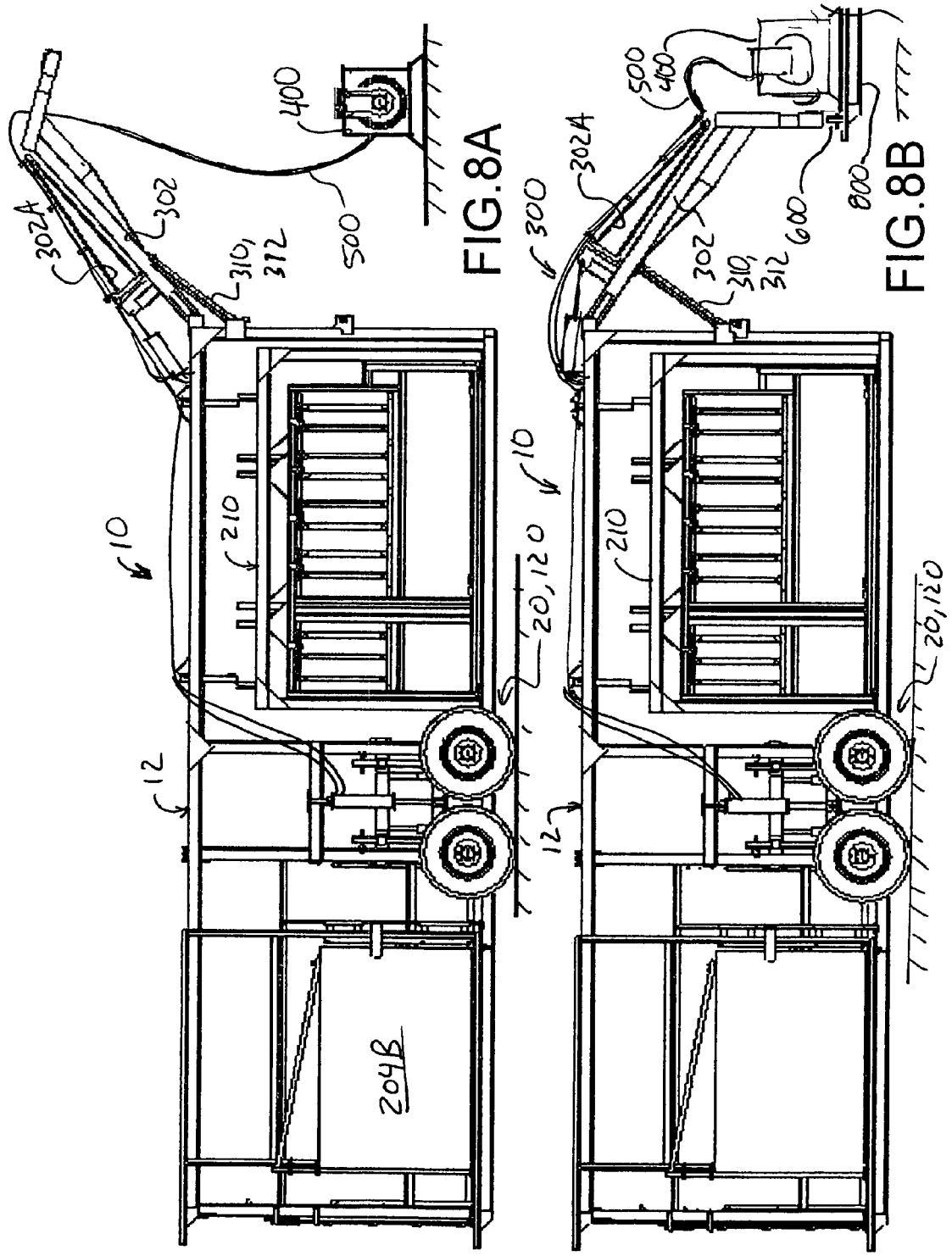
FIG. 8A is a side view of the trailer of the present invention with the hitch assembly in the stowed position.
FIG. 8B is a side view of the trailer of the present invention with the hitch assembly in the trailering position.

As can be seen in FIGS. 8A and 8B, hitch assembly 300 moves between a first lowered position shown in FIG. 8B and a second raised, stowed position shown in FIG. 8A. Hitch assembly 300 includes a pivoting arm 302 rotatably mounted to frame 12, two braces 310 and 312, a hydraulic line boom 302A and a hydraulic cylinder 314. Pivoting arm 302 also includes a coupling member 302B. Coupling member 302B is of a typical design well known in the art for coupling to a corresponding structure mounted on a tractor vehicle.

Figures 9, 9A:
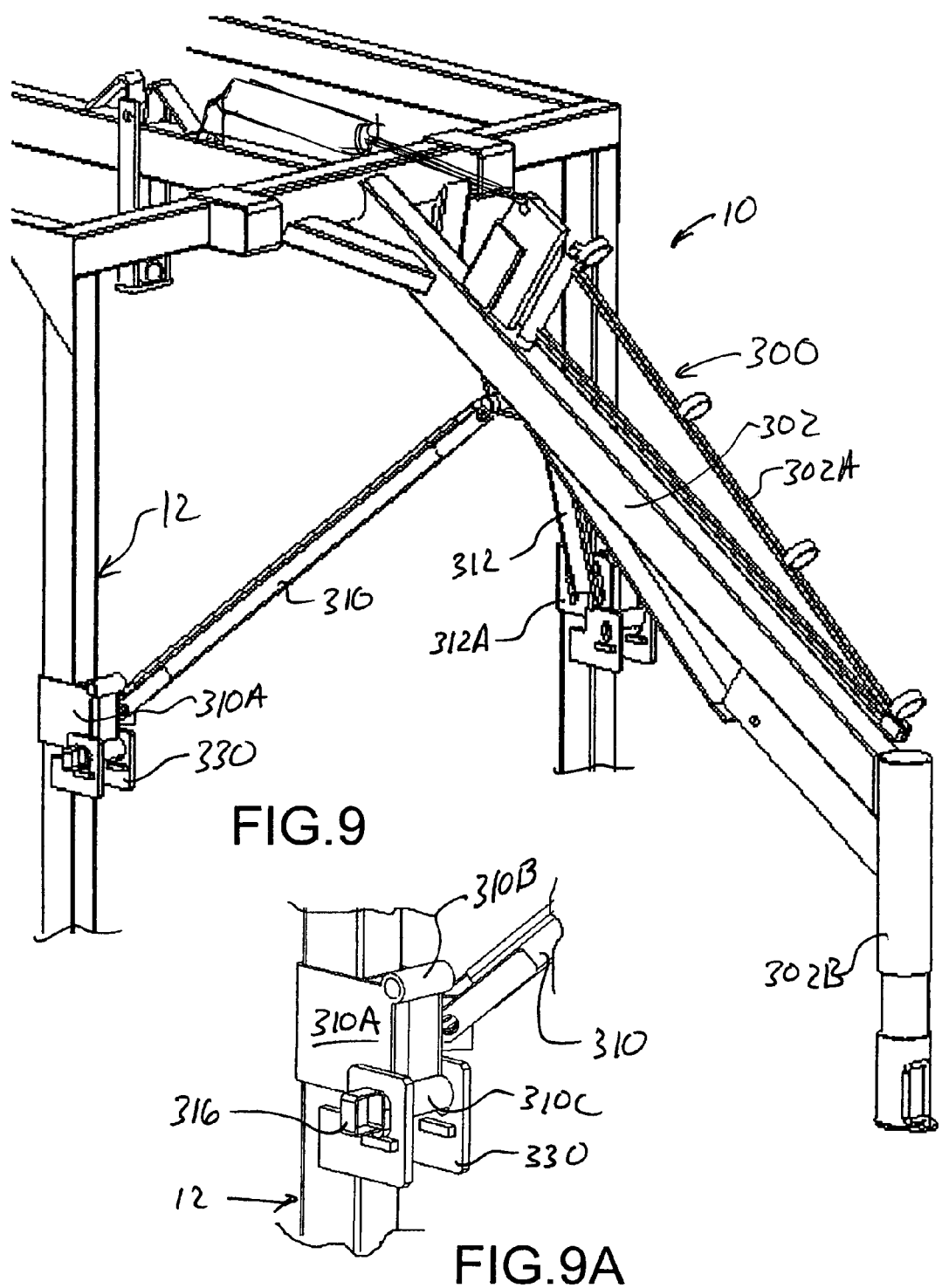
FIG. 9 is a detailed perspective view of the hitch assembly in the trailering position.
FIG. 9A is a detailed perspective view of an assembly for locking the hitch assembly in the first lowered, trailering position.
Figures 10, 10A:
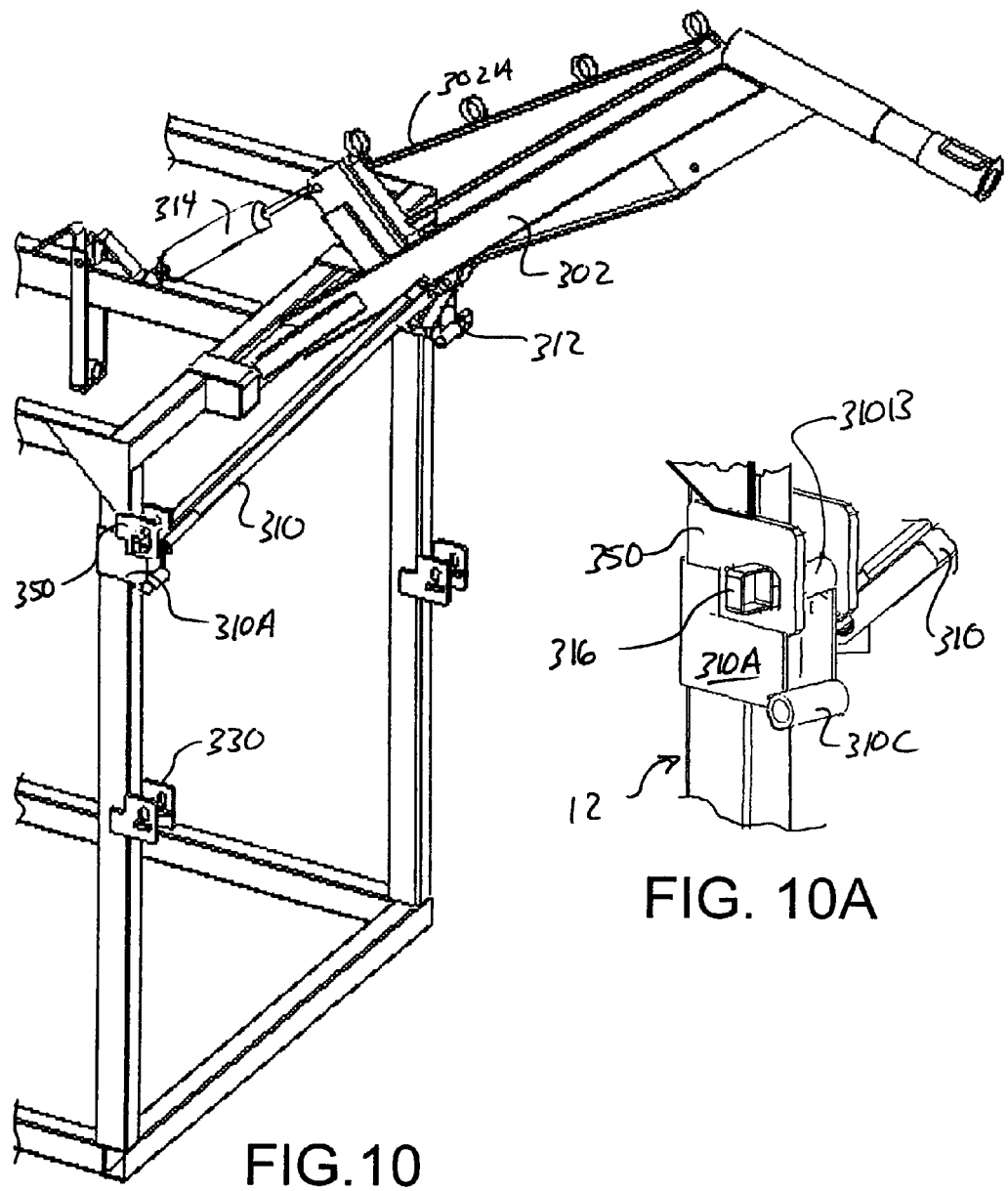
FIG. 10 is a detailed perspective view of the hitch assembly in the stowed position.
FIG. 10A is a detailed perspective view of an assembly for locking the hitch assembly in the second raised stowed position.

Hitch assembly 300 is actuated by hydraulic cylinder 314 for motion between a first lowered position for trailering as shown in FIGS. 8B and 9 and a second raised position for stowing as shown in FIGS. 8A and 10. Hydraulic line boom 302A is pivotably mounted at its proximate end toward the proximate end of pivoting arm 302. Accordingly, hydraulic line boom 302A may be pivoted away from boom 302. As shown in FIG. 8A, hydraulic line boom 302A includes a series of guide rings for guiding hydraulic lines 500 that run between a power unit 400 and the various hydraulic cylinders of trailer 10. Power unit 400 is usually carried by tractor vehicle 800 shown in FIG. 8B when trailer 10 is being transported, but may be placed off to the side when trailer 10 is stationary. Moreover, hydraulic line boom 302A may be pivoted toward power unit 400 in order to receive and guide hydraulic lines 500 between power unit 400 and trailer 10. An alternative function of hitch assembly 300 (and hitch assembly 1000 described below) is that it can be operated as a crane to lift and move portable power unit 400 between the bed of tractor vehicle 800 and ground level.

Braces 310 and 312 structurally support pivoting arm 302 of hitch assembly 300. Braces 310 and 312 are designed to move with pivoting arm 302 as pivoting arm 302 moves between a first lowered position and a second raised position. Braces 310 and 312 are also designed to be temporarily fixed or locked in either of those two positions. Translating side braces 310 and 312 are pivotably mounted to pivoting arm 302 at their proximate ends and also pivotably engage collars 310A and 312A at their distal ends. Collars 310A and 312A are able to slide up and down respective upright members of frame 12. As can be seen in FIG. 9A, collar 31A, like collar 312A, has upper and lower pin channels 310B and 110C. In FIG. 9A, collar 310A is shown secured by a pin 316 inserted through lower pin channel 310C such that collar 310A is secured to a lower bracket 330. This secures translating side brace 310 to frame 12 in the first lowered position. The same arrangement is repeated on the other side with translating side brace 312 so that side brace 312 is also secured in the first lowered position. This locked positioning of side braces 310 and 312 provides a secure, strong and rigid structure for trailering. In a similar fashion, side braces 310 and 312 can be locked in a second raised position as shown in FIGS. 10 and 10A. In FIG. 10A, collar 310A is shown secured by a pin 360 inserted through upper pin channel 310B such that collar 310A is secured to an upper bracket 350. This secures translating side brace 310 to frame 12 in the second raised or stowed position. The same arrangement is repeated on the other side with translating side brace 312 so that side brace 312 is also secured in second raised or stowed position. This locked positioning of side braces 310 and 312 in the stowed position provides a secure support so that hitch assembly 300 does not interfere with process operations.

Figure 11:
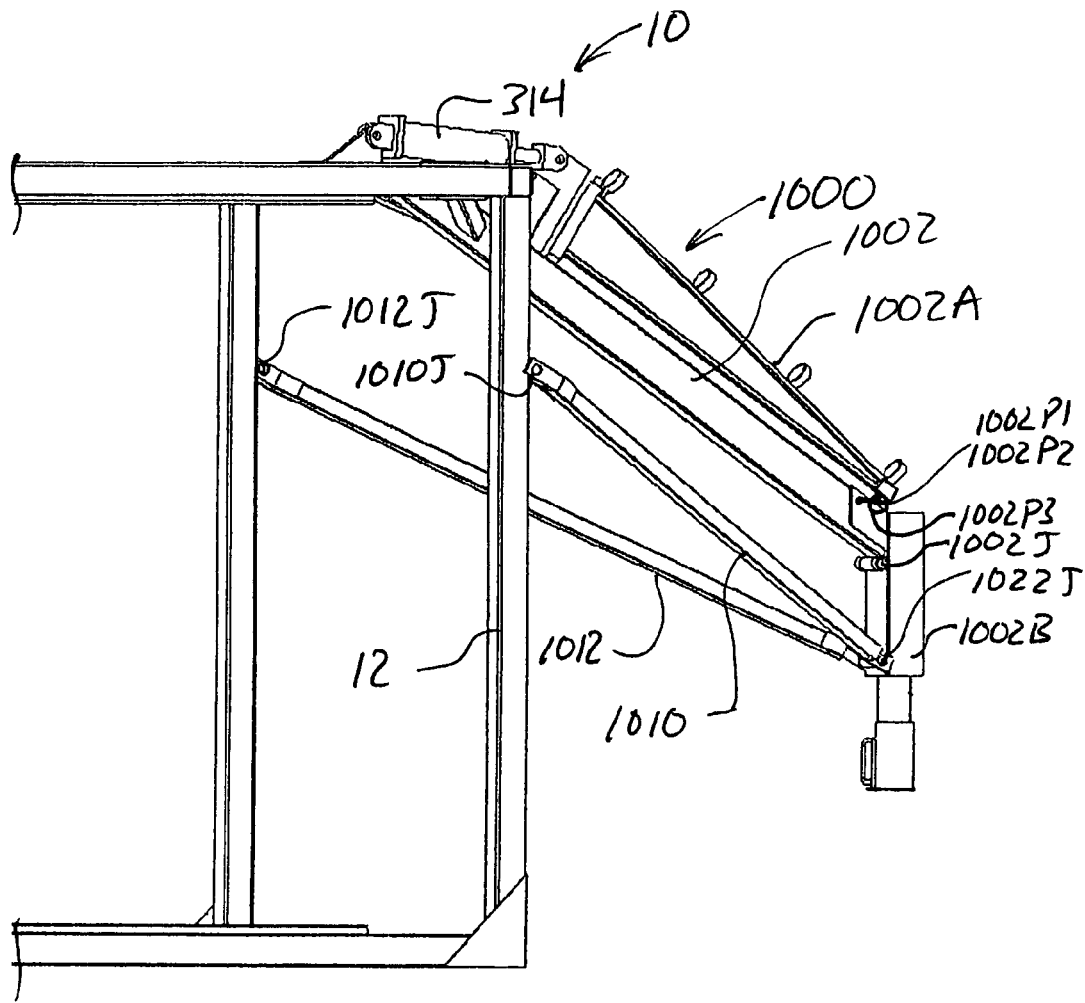
FIG. 11 is a detailed perspective view of a second embodiment hitch assembly in the trailering position.
Figure 12:
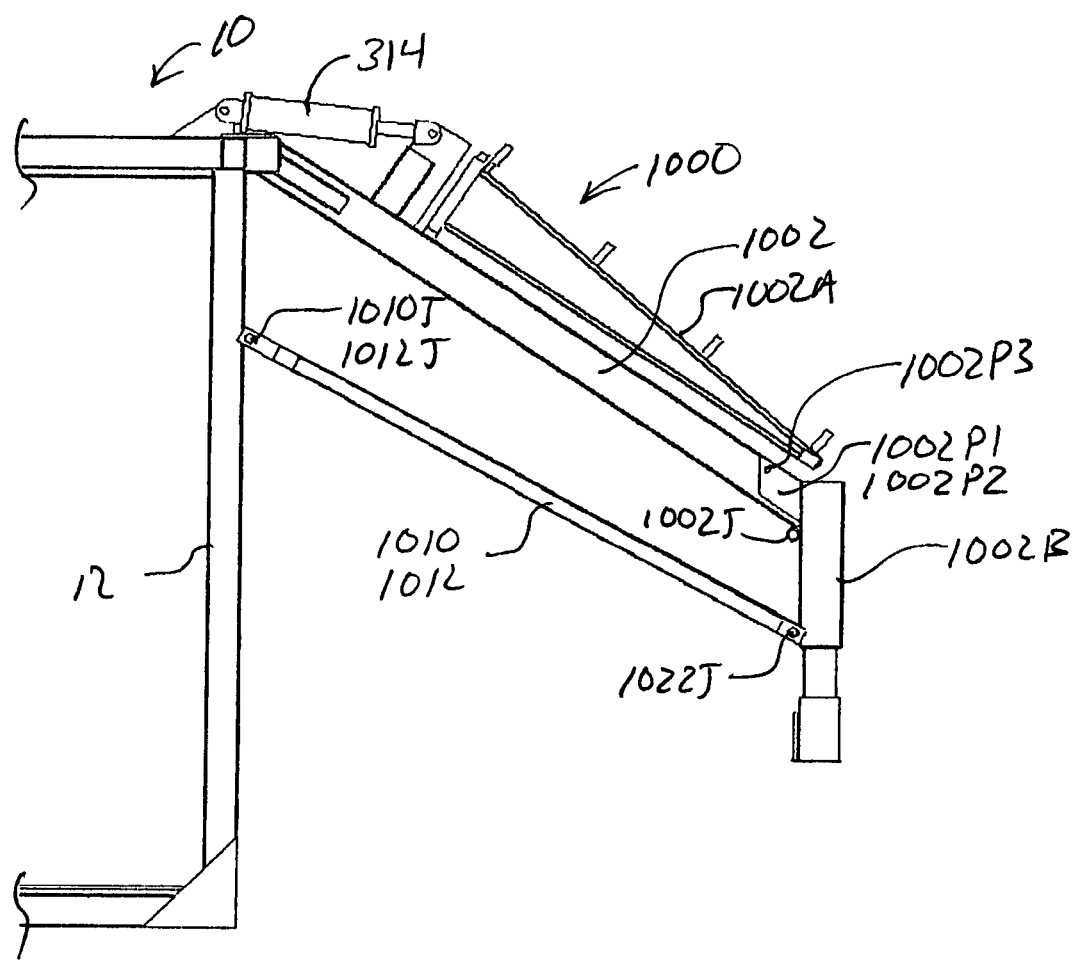
FIG. 12 is a side view of the second embodiment hitch assembly in the trailering position.
Figure 13:
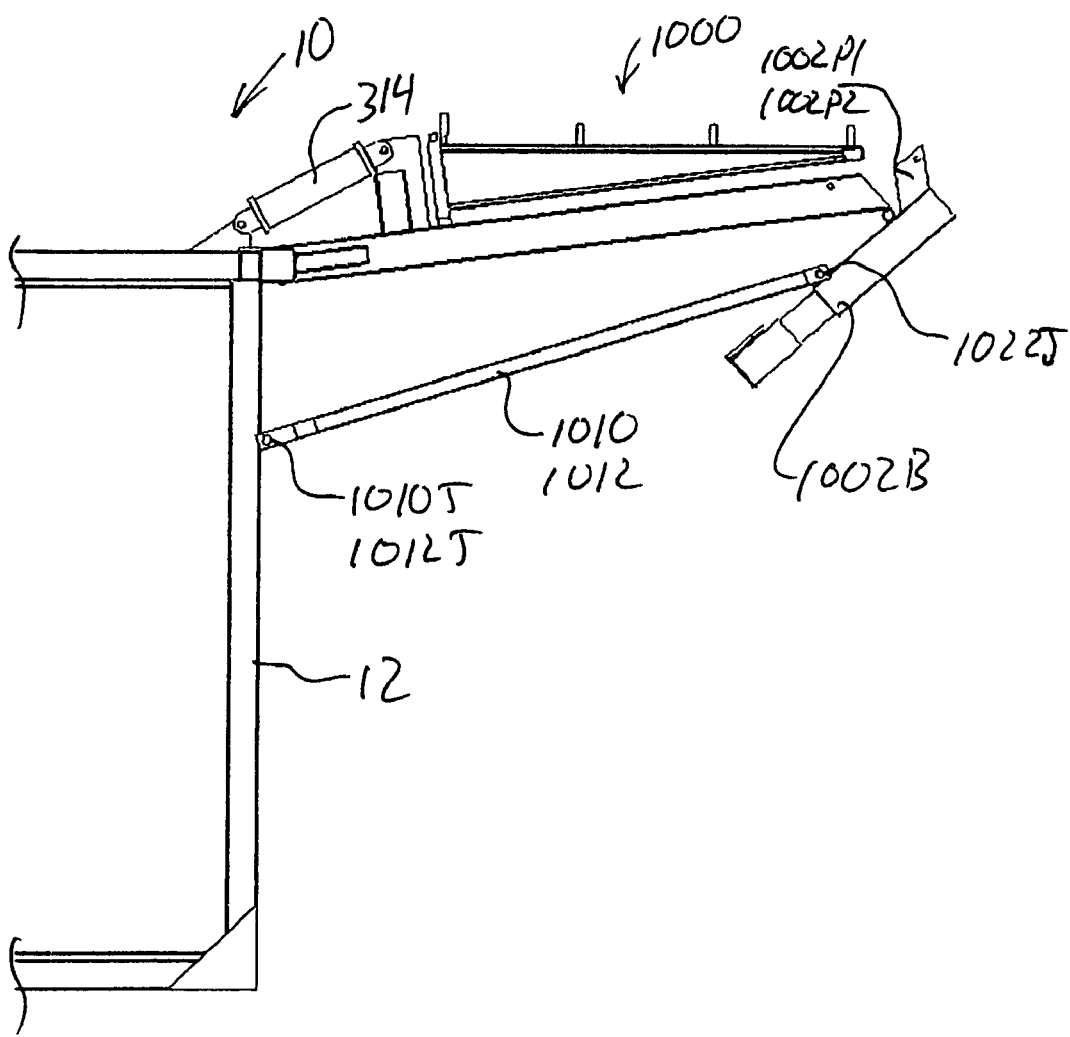
FIG. 13 is a side view of the second embodiment hitch assembly in the raised, stowed position.

FIGS. 11-13 illustrate a second embodiment of the pivoting hitch assembly, a pivoting hitch assembly 1000 which like hitch assembly 300 moves between a first lowered position shown in FIGS. 11 and 12 and a second raised, stowed position shown in FIG. 13. Hitch assembly 1000 includes a pivoting arm 1002 rotatably mounted to frame 12, two braces 1010 and 1012, a hydraulic line boom 1002A and a hydraulic cylinder 114. Pivoting arm 1002 also includes a coupling member 1002B. Coupling member 1002B is of a typical design well known in the art for coupling to a corresponding structure mounted on a tractor vehicle.

Coupling member 1002B is pivotably mounted pivoting arm 1002 at joint 1002J. A pair of plates 1002P1 and 1002P2 are fixed to coupling member 1002B and extend from coupling member 1002B on opposite sides of the end of pivoting arm 1002. A pin 1002P3 is inserted through matching holes in plates 1002P1 and 1002P2 to lock coupling member 1002B in relation to pivoting arm 1002 so that hitch assembly 1000 may be locked in the first, trailering or lowered position. When pin 1002P3 is removed, hitch assembly 1000 may be lifted into the raised, stowed position.

Braces 1010 and 1012 structurally connected between frame 12 and coupling member 1002B of hitch assembly 1000. Braces 1010 and 1012 are designed to pivot at both ends and therefore move with coupling member 1002B as it moves with hitch assembly 1000 between a first lowered position and a second raised or stowed position. Braces 1010 and 1012 are also designed to be temporarily fixed or locked in the first, lowered or trailering position by placement of pin 1002P3 through opposite corresponding holes in plates 1002P1 and 1002P2 of coupling member 1002B and pivoting arm 1002. Hydraulic cylinder 114 is used to hold hitch assembly 1000 in the raised or stowed position.

Hitch assembly 1000 is actuated by hydraulic cylinder 314 for motion between a first lowered or trailering position as shown in FIGS. 11 and 12 and a second raised or stowed position as shown in FIG. 13. As with the Figures discussed above for the first embodiment of the hitch assembly, these Figures, omit for clarity the hydraulic lines feeding hydraulic cylinder 314. As with hitch assembly 300 described above, hydraulic line boom 1002A is pivotably mounted at its proximate end toward the proximate end of pivoting arm 1002. Hydraulic line boom 1002A includes a series of guide rings for guiding hydraulic lines that run between a portable power unit (not shown) and the various hydraulic cylinders of trailer 10. As with hitch assembly 300 described above, an alternative function of hitch assembly 1000 is that it can be operated as a crane to move a portable power unit between the bed of the tractor vehicle and ground level.

As can be seen from the above detailed description, trailer 10 provides a versatile, transportable unit for conducting processes with process items—such as cattle being moved through veterinary procedures. Because trailer 10 can be raised and lowered between a first lowered position and a second raised position for transport, trailer 10 can be operated as a transportable unit and also operated as an efficient unit for conducting processes with items that are preferably moved into, through and out of the unit rapidly. Also because trailer 10 includes a hitch that can be pivoted into a stowed position, an entrance or exit can be positioned at the hitch end of trailer 10 and used without the hindrance of an obstruction.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A hitch assembly for a trailer including a frame having at least two upright members, the hitch assembly comprising:
   a pivoting arm including a distal end and a proximate end, the proximate end pivotably mounted to one end of the trailer for rotating motion between a first lowered position wherein the distal end of the arm is coupled to a tractor vehicle and a second raised position wherein the pivoting arm is pivoted away from the end of the trailer,
   two braces each having a proximate end and a distal end, each distal end of each brace pivotably mounted to the distal end of the pivoting arm and each proximate end of each brace slidably mounted to one of the at least two upright members of the frame by collars adapted for sliding motion up and down along one of the at least two upright members of said frame, and
   locking means for locking the collars in relation to the upright members in the lowered position and for locking the collars in relation to the upright members in the raised position, whereby when the collars are not locked the pivoting arm may be pivoted to a lowered position and locked in the lowered position by locking the collars for trailering and whereby the pivoting arm may be pivoted when the collars are unlocked to a raised position and locked in the raised position by locking the collars to provide clearance for passage of items from inside the trailer under the pivoting arm.

2. The hitch assembly of claim 1, further comprising:
   a hydraulic line boom pivotably mounted to the pivoting arm for receiving and guiding hydraulic lines leading to the trailer.

* * * * *